Dec. 18, 1956
P. F. ASHWOOD ET AL
JET FLOW CONTROL FOR JET-SUSTAINED
AND JET-PROPELLED AIRCRAFT
2,774,554
Filed May 25, 1953
2 Sheets-Sheet 1
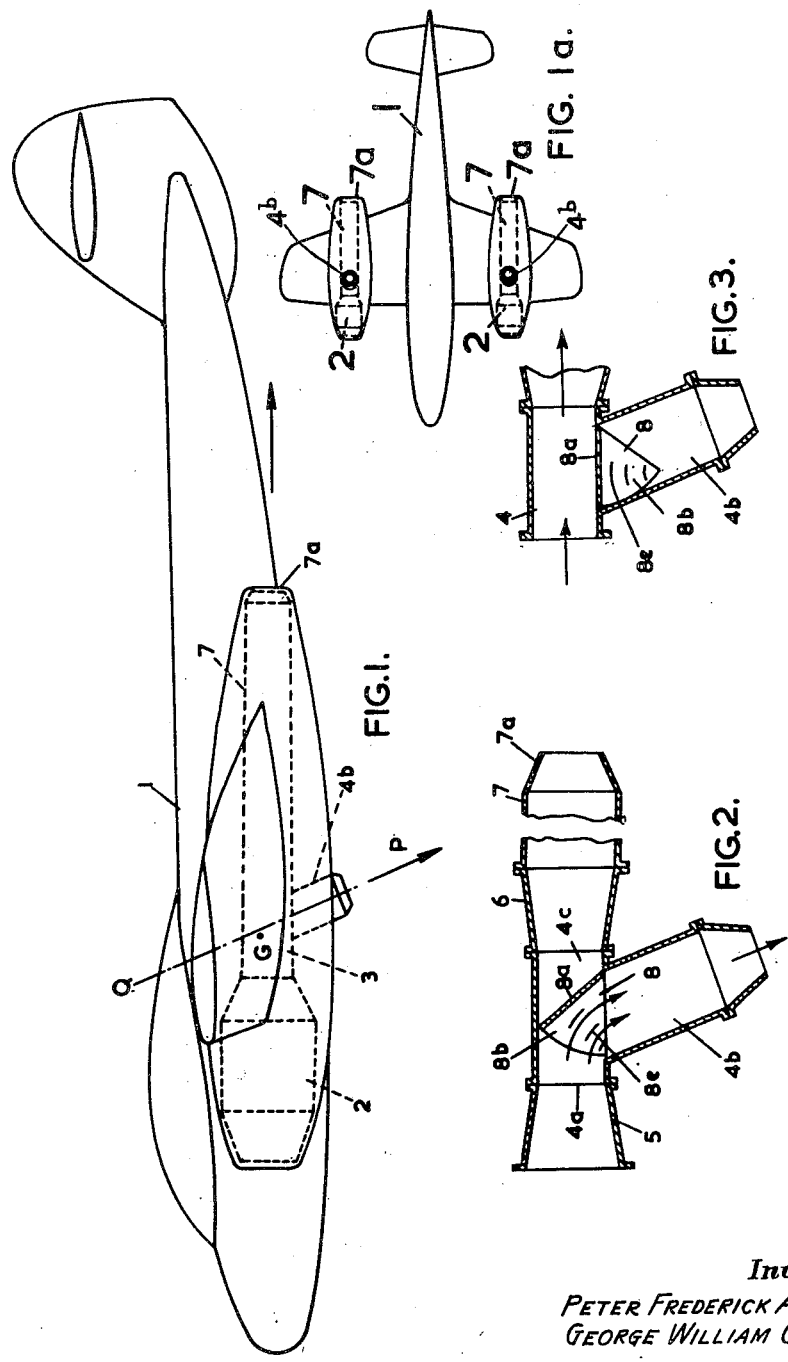
Inventors
PETER FREDERICK ASHWOOD AND
GEORGE WILLIAM CROSSE
By Stevens, Davis, Miller & Mosher
Attorneys

United States Patent Office 2,774,554
Patented Dec. 18, 1956

2,774,554

JET FLOW CONTROL FOR JET-SUSTAINED AND JET-PROPELLED AIRCRAFT

Peter Frederick Ashwood, Farnham, and George William Crosse, Aldershot, England, assignors to Power Jets (Research and Development) Limited, London, England, a British company Application May 25, 1953, Serial No. 357,116

Claims priority, application Great Britain May 30, 1952

5 Claims. (Cl. 244—23)

When a high-speed jet-propelled aircraft is landing, it is desirable to reduce the landing speed to a minimum, in particular by deflecting the jet or jets to destroy the propulsive thrust, and also to utilise the whole of the deflected jet thrust to produce an upthrust on the aircraft to compensate for loss of lift due to reduction of speed. In order that the upthrust does not produce any substantial turning moment about the centre of gravity of the aircraft its line of action should pass, as nearly as possible, through the centre of gravity. This latter requirement involves locating the jet propulsive power unit as far forward as possible, and if the deflection were to take place at the rear end of the jet nozzle, substantially the whole of the unit would have to be located forward of the centre of gravity of the aircraft. Jet thrust spoilers hitherto proposed for aircraft have been on the rear end of the jet nozzle and have been concerned with destroying the forward propulsive effect of the jet, by annularly outward diversion of the jet, or by forward diversion.

The present invention provides for smooth and efficient downward deflection of the whole of the gas stream, upstream of the nozzle. Thus the invention consists firstly in the provision, in the jet pipe of an aircraft, of a nozzle unit including a bifurcated portion having a forwardly facing inlet, a downwardly turned discharge branch terminating in a nozzle discharging to atmosphere along a line which cuts or passes near to a transverse line through the centre of gravity of the aircraft, and a rearwardly extending branch terminating in a rearwardly discharging jet nozzle, in combination with deflecting means movable in said bifurcated portion from a position blocking up the downward discharge branch while leaving the rearward branch open, to a position blocking up the rearwardly extending branch and deflecting the jet into the downward branch. There may be a slidable, rotary, or hinged deflector, or combination of hinged deflectors.

The invention consists furthermore in the provision, in the jet pipes of the engines of multi-engined aircraft, of nozzle units (including jet deflecting means therein) as aforesaid but with their downward branches terminating in nozzle orifices discharging along lines so disposed about the centre of gravity that the line of action of the resultant thrust passes through or near to the centre of gravity of the aircraft.

The invention is illustrated by the accompanying drawings of which:

Figure 1 shows an aircraft with rearwardly and downwardly directed jet nozzles;

Fig. 1a is a plan view, on a reduced scale, of the aircraft of Figure 1 seen from below;

Figures 2 and 3 show in longitudinal section a nozzle unit for attaching to the jet pipe, comprising a bifurcated portion, rearwardly and downwardly discharging nozzles, and a hinged jet deflecting vane;

Figures 7 and 8 are further similar views of a unit containing one form of rotary jet deflector, while

Figure 6:
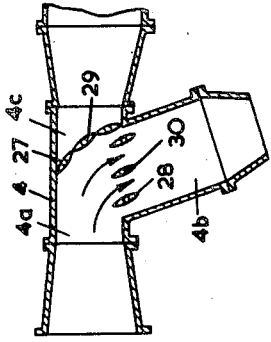
Figure 6 is a view similar to Figures 2–5 of a unit containing hinged vanes as the deflecting means.

In Figure 1 the aircraft 1 is propelled by a jet engine 2 discharging through a jet pipe 3 either into a rearwardly directed nozzle pipe 7 with nozzle 7a for normal forward flight or, on occasion—for example during landing or take-off—into the downwardly discharging nozzle 4b. The latter nozzle is shown as discharging along the line PQ which when continued to Q passes through or very near to the centre of gravity G of the aircraft. If there is only a single jet engine the line PQ passes through or very near to the physical point constituting the centre of gravity. Usually there will be engines spaced on opposite sides of the fore-and-aft centre-line of the aircraft, as shown in Figure 1A, in which case G is an end view of a line passing transversely through the centre of gravity, perpendicular to the line of flight, and the lines represented by PQ will cut or pass near to this transverse line. With a single engine, or with engines in line, the resultant upthrust must pass near enough to the centre of gravity to cause no undue moment about the centre of gravity. In a multi-engined aircraft, one or more engines may discharge along a line passing some distance to the rear of the centre of gravity if this be balanced by one or more engines discharging along a line passing in front of the centre of gravity so that the resultant upthrust due to all the engines will pass very close to G.

The nozzle unit of Figures 2 and 3 comprises a connecting portion 5—flanged at front and rear ends for attachment to the jet pipe and to the rest of the unit respectively—which changes progressively in internal cross-section from circular at its front end to rectangular at its rear end, without change of cross-sectional area. Attached to the rear end is the bifurcated tubular portion consisting of a T piece 4 and a pipe 6 rearwardly extending to the jet nozzle pipe; these two pieces 4 and 6 may be separately formed and attached together by yet another flanged joint. The T piece 4 is internally of rectangular cross section, and consists of the forwardly facing inlet 4a, the rearwardly continuing branch 4c, these together joining the exhaust pipe to the rear nozzle without appreciable change of shape or direction, and, branching therefrom, a downwardly directed discharge branch pipe 4b. The latter is shown straight and terminating in a contraction, the plane of the discharge orifice being perpendicular to the axis of the discharge branch. Although this axis could be vertical—when the aircraft is in its position for normal horizontal flight—it is shown pointing slightly rearward at a small angle to the vertical. The nozzle pipe 7, which terminates as usual in a contracting nozzle 7a forming an orifice with its plane vertical, may be internally of rectangular cross-section but preferably changes smoothly from rectangular to circular section.

Mounted within the T piece 4 is a deflector vane 8 hinged about an axis lying across the width of the T piece, along the line of the rearward junction of the downward discharge branch 4b with the other part 4c. This deflector 8, which is of channel cross-section, consists of a flat top plate 8a and two side wings 8b. In the position for normal flight as shown in Figure 3 the flat top 8a, which is of the full internal width of the T piece 4, forms the bottom floor of the connection between the pipe 5 and the pipes 6 and 7; this top then covers and blocks up the entrance to the downward discharge branch 4b, and the side wings 8b lie within the latter. For minimising leakage of the jet through the downward discharge branch the top 8a will fit in the rectangular entrance to the downward branch with only a small clearance.

The deflector vane 8 can be moved about its hinge axis to move the top plate 8a upwards until its forward edge is separated by only a small clearance from the top internal wall of the T piece 4. In this position as shown in Figure 2, the plate lies obliquely across the jet pipe, blocking up the entrance to the propulsion nozzle and forming a wall of a "pipe-bend" connecting the forward inlet to the downward discharge pipe.

A hinge pin turning with the vane extends through a sealing gland in the side wall to an external supporting bearing on one or preferably both sides of the connecting portion of the T piece. For operating the deflector vane, a crank arm is secured to the hinge pin outside the jet pipe and connected by a link to the operating mechanism; for example, the link is connected to the piston rod of a hydraulic actuator.

Figure 5:
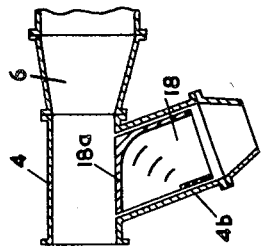
Figures 4 and 5 are similar views to Figures 2 and 3 of a unit containing a slidable jet deflector.
Figure 4:
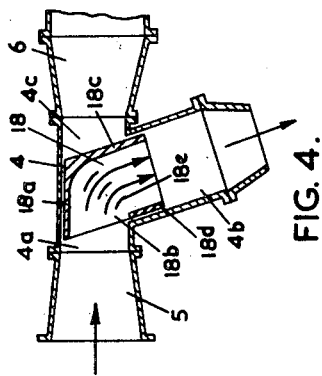

In the modification shown in Figures 4 and 5 the pipe, T piece 4 and said pipe 6 are as already described but a slidable deflector 18 is used instead of the hinged vane 8. This deflector 18, which is a hollow box having a top plate 18a similar to that of the hinged vane 8, two side plates 18b and a rear end plate 18c joining together the plates 18a and 18b, is a close fit inside the T piece 4 and can slide along the downward discharge branch 4b; when it is in its lower position as shown in Figure 5 and wholly in that branch the top plate is a close fit in and so blocks up the entry to the downward discharge branch as already described. The deflector 18 can slide upwards until the top plate 18a bears against the top wall of the T piece, as shown in Figure 4. There may be a part front wall 18d on the deflector joining the side walls, but, if so, this is partly cut away so that the deflector can present a full opening forwardly facing towards the inlet 4a to the T piece and a full opening downwards into the downward discharge branch. The internal junction of the top plate 18a and rear wall 18c is curved so that the interior of the deflector box constitutes a smoothly curved "pipe bend" for diverting the jet into the downward discharge branch.

For operating the sliding deflector 18 a pair of crank arms may be provided inside the T piece, in clearance space between the side walls of the deflector and the side walls of the T piece. These arms have forked ends or slotted holes engaging trunnions extending from the side walls of the deflector, so that swinging motion of the arms will cause sliding of the deflector. These crank arms turn with a hinge pin which is operated as already described for the hinged vane.

In an alternative operating arrangement there are rack teeth recessed into the outside rear wall of the deflector engaged by a pinion on a shaft which extends outside the T piece as already described for the hinge pin and rotatable by the actuator.

Extending between the side walls 18b of the box 18 of Figures 4 and 5 and between the side wings 8b of the vane 8 of Figures 2 and 3, are several vanes which are curved to the curvature of the "pipe bend" and may be aerofoil profiled; these are shown at 18e and 8e respectively and serve to guide the stream around the bend and reduce losses in well-known manner.

When the device is used during landing of the aircraft the throttle is first closed to reduce the fuel supply to the power unit and so initiate speed reduction; the deflector 8 or 18 is then moved to block the rearward branch and deflect the jet wholly into the downward branch and the throttle is re-opened so as to give full jet thrust along the axis of the downward discharge pipe. A single operating member may close the throttle during the first part of the movement, then move the deflector, and finally, during the last part of the movement, re-open the throttle.

The width of the rectangular part of the nozzle unit may be greater than its depth, or these dimensions may be equal—"rectangular" being used herein to include "square."

In the modified arrangement shown in Figure 6 the deflecting means consist of two sets of hinged vanes 27 and 28; each vane is thin and projects on opposite sides from a small spindle 29 or 30 passing right across the T piece. Spindles 29 have their axes spaced along a curve representing a desirable curved outer wall of a pipe-bend for deflecting the jet downwards; the vanes 27 on these spindles can be turned from a position lying (as shown) edge-to-edge to form part of a polygonal surface approximating to the said pipe bend curvature to one in which they lie parallel to the axis of the rearward branch. The vanes 28 form parallel shutters which can turn with spindles 30 from the position shown to one in which they lie edge-to-edge across the entrance to the downward discharge branch. The spindles 29 and 30 have crank-arms secured to them outside the jet pipe, of lengths to give the appropriate angular movements, and all linked together and to a common actuator.

Again, the deflector could be a slidable block or swinging sector movable across the width of the T piece, from a position in which a straight passage through it registers with the jet pipe, to a position in which a curved passage, forming a pipe bend, is in register with the inlet 4a and the downward branch.

In the further form shown in Figures 7–10 the deflecting means consists of an element rotatable about an axis lying between and in the same plane as lines along the desired rearward and downward directions of the jet.

Figure 9:
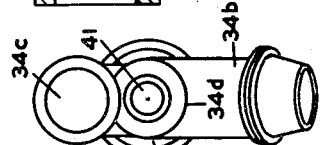
Figure 9 is a view looking on the end of Figure 7.
Figure 8:
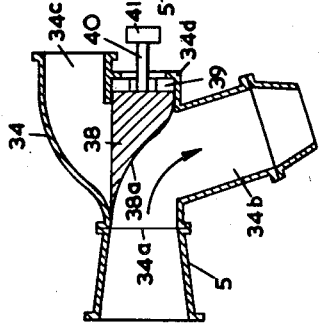
Figure 7:
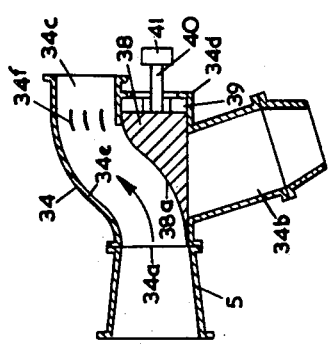

In the particular example shown in Figures 7–9 the bifurcated portion 34, taking the place of the T piece 4, has a forwardly facing inlet 34a connected to the pipe 5, the downward branch 34b and a rearward discharge branch 34c parallel to but either above or below the inlet portion 34a, all of which are now cylindrical as can be seen in the end view Figure 9; it also has a rearward extension 34d serving only as a cylinder housing part of the deflector. A curved upper wall 34e forms a smooth transition from the inlet 34a to the branch 34c and curved corner guide vanes 34f can be provided. The deflector consists of a cylinder member 38 fitting in and rotatable in the cylinder 34d having a portion 38a shaped to serve as one wall of a "pipe-bend" which in one position, as shown in Figure 7 connects the inlet 34a to the branch 34c and in the other position as shown in Figure 8 connects the inlet 34a to the downward discharge branch 34b. Thrust bearing 39 are provided behind member 38, which has an actuating spindle 40 carrying a driving pinion 41.

Figure 10:
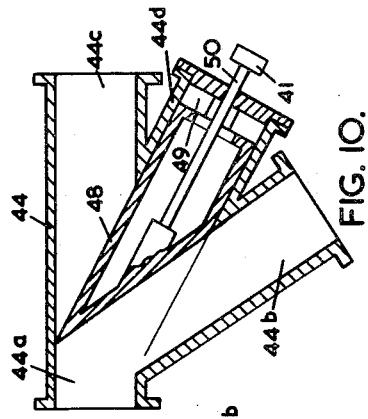
Figure 10 is a view similar to Figure 8 of a unit containing another form of rotary jet deflector.

In the further example shown in Figure 10 the bifurcated portion 44 has its cylindrical inlet 44a and rearward branch 44c in line, these and the downward branch 44b all intersecting the cylinder 44d containing the deflector element 48 which is now a frustum of a cylinder bearing against thrust bearings 49 and rotatable through a half turn about the cylinder axis, by spindle 50 driven by the driving pinion 41, from the position shown—in which it directs the jet from inlet 44a to downward branch 44b—to one in which it closes the entrance to the branch 44b and leaves inlet 44a connected to branch 44c.

What we claim is:

1. In the jet pipe of a jet-propelled aircraft, a nozzle unit including firstly a bifurcated portion having a forwardly facing inlet, a downwardly turned discharge branch terminating in a nozzle orifice discharging to atmosphere along a line which cuts or passes near to a transverse line through the center of gravity of the aircraft, and a rearwardly extending branch terminating in a rearwardly discharging jet nozzle orifice, in combination secondly with deflecting means movable in said bifurcated portion from a position blocking up the said downwardly turned discharge branch while leaving the rearwardly extending branch open, to a position blocking up the rearwardly extending branch and deflecting the jet into the downwardly turned branch, said deflecting means including at least one element which, when the means are in the position for deflecting the jet downwards, provides guiding surfaces lying substantially along the desired path of the deflected jet.

2. In a jet-propelled aircraft, a nozzle unit according to claim 1 including a plurality of the said elements forming a series of curved corner vanes spaced across the path of the jet stream.

3. In the jet pipe of a jet-propelled aircraft, a nozzle unit including firstly a bifurcated portion having a forwardly facing inlet, a downwardly turned discharge branch terminating in a nozzle orifice discharging to atmosphere along a line which cuts or passes near to a transverse line through the centre of gravity of the aircraft, and a rearwardly extending branch terminating in a rearwardly discharging jet nozzle orifice, in combination secondly with a hinged deflecting vane movable from a position lying obliquely across the bifurcated portion in a direction inclined from the direction of the forward inlet towards the downwardly turned branch to define a surface for guiding the jet from the rearward direction into the downwardly turned branch and including at least one guiding element attached to and movable with said hinged deflecting vane into a position to define therewith a transitional jet path into said downwardly turned branch.

4. In a jet-propelled aircraft, a nozzle unit according to claim 1 in which said deflecting means comprises a shutter slidable transversely across said bifurcated portion from a position blocking up said downwardly turned discharge branch while leaving the rearwardly extending branch open, to a position blocking up the rearwardly extending branch and deflecting the jet into the downwardly turned branch.

5. In a jet-propelled aircraft, a nozzle unit according to claim 1 in which said deflecting means comprises hinged shutter means, movable from a position lying along the direction of the rearward branch to one forming a wall blocking the rearward branch and defining the boundary of a path from the forward inlet into the downward branch, and further hinged shutter means movable from a position blocking the downward branch to a position for deflecting the jet downwards.

References Cited in the file of this patent

UNITED STATES PATENTS

| | | |
|---|---|---|
| 684,153 | Wheildon | Oct. 8, 1901 |
| 1,388,523 | Noakes | Aug. 23, 1921 |
| 1,425,642 | Greve | Aug. 15, 1922 |
| 1,714,917 | Martin | May 28, 1929 |
| 2,024,274 | Campini | Dec. 17, 1935 |
| 2,657,881 | Douglas | Nov. 3, 1953 |

FOREIGN PATENTS

| | | |
|---|---|---|
| 427,728 | Italy | Nov. 26, 1947 |